March 8, 1949.  C. B. RICHEY  2,463,716
TRAILER STUB POLE SURGE BRAKE
Filed March 7, 1946  2 Sheets-Sheet 1
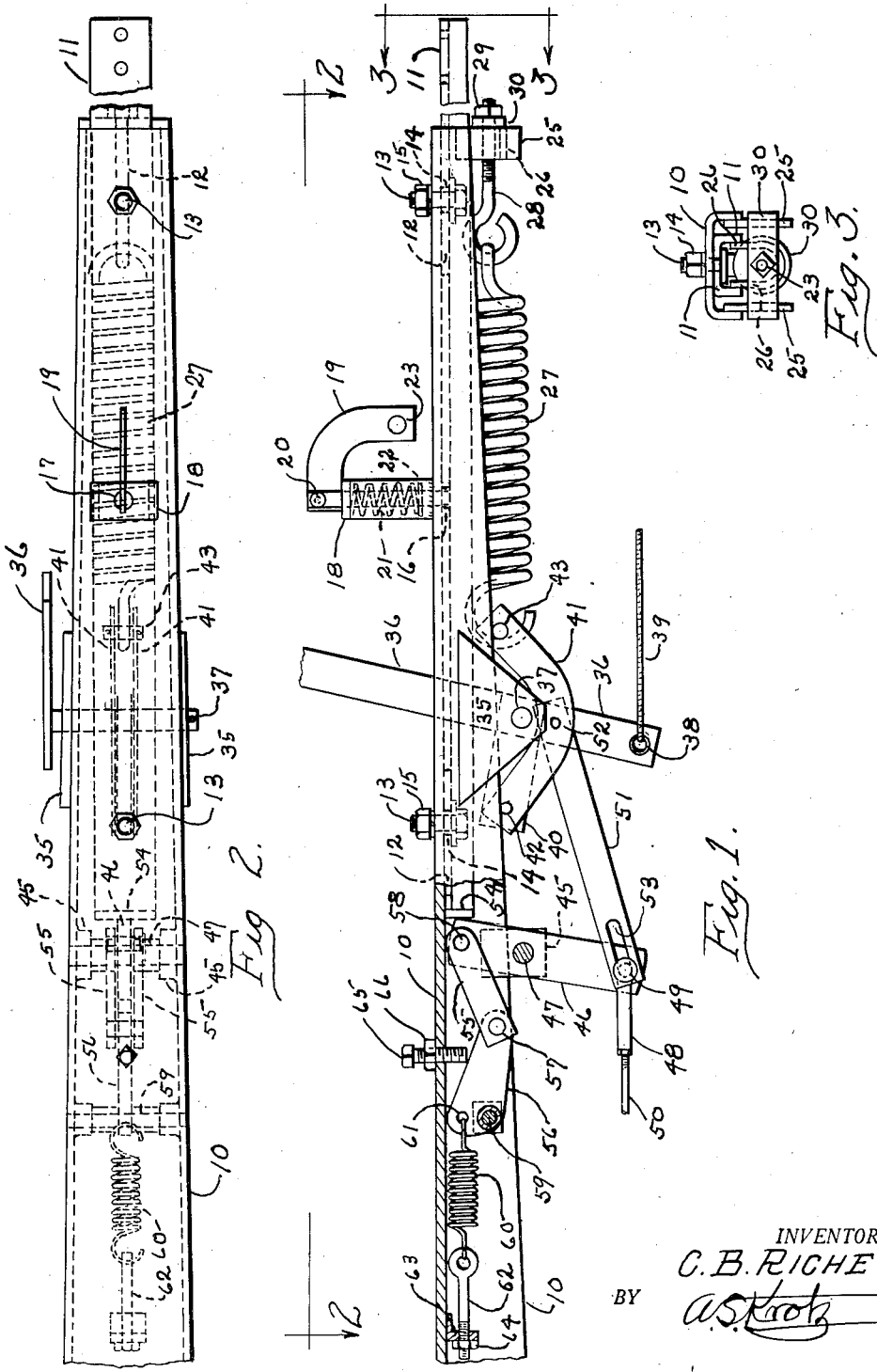
INVENTOR.
C. B. RICHEY
BY
ATTORNEY

INVENTOR.
CLARENCE B. RICHEY

Patented Mar. 8, 1949

2,463,716

UNITED STATES PATENT OFFICE 2,463,716

TRAILER STUB POLE SURGE BRAKE

Clarence B. Richey, Quincy, Ill., assignor to Electric Wheel Company, Quincy, Ill., a corporation of Illinois Application March 7, 1946, Serial No. 652,548

8 Claims. (Cl. 188—142)

The present invention relates to a stub pole surge brake which is automatically operated by its connection to the tractor and has for its objects providing a device of the character which is simple, safe, light and efficient, and easily manufactured at low cost.

An object of my invention is to provide an adjustable stop to prevent application of the trailer brake by light reverse force such as is caused by suddenly closing the throttle of the towing vehicle.

A further object of my invention is to provide a manually operated lock-out pin to provide for backing the trailer without engaging the trailer brakes.

Another object of my invention is to provide a manually operated lever having a connection to a cushion spring, which holds the lever in its normal non-operating position or in its brake operating position, the spring also acting to yieldingly resist the forward movement of the sliding or hitch member on the stub pole.

A still further object of my invention is to provide for an automatic application of the brakes if the trailer breaks loose from the towing vehicle.

It will be seen from the above preamble that my surge brake is all inclusive because it provides all desirable operating features and is therefore safe and reliable.

To these and other useful ends my invention consists of parts, combination of parts, or their equivalents and mode of operation as hereinafter described and claimed and shown in the accompanying drawings in which:

Fig. 1 is an elevational side view of a fraction of a stub pole equipped with my invention.

Fig. 2 is a top view of the device as shown in Figure 1.

Fig. 3 is a front view of the device as viewed from line 3—3 of Figure 1.

Figure 4:
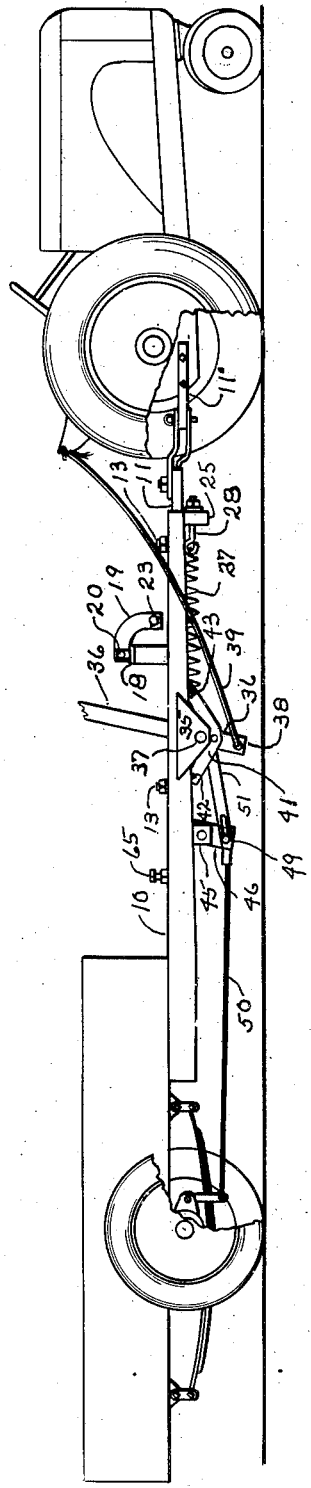
Figure 4 is a side elevational view of my improved hitch bar attached to a trailer and tractor and illustrating the connection to the brakes on the trailer.

As thus illustrated the stub pole is designated by reference numeral 10, the rear end of which is cut-away and is adapted to be secured to the trailer. The sliding member 11 is adapted to be hitched to the tractor or pulling vehicle. Member 11 is positioned between the flanges of member 10 as illustrated in Figure 3. Members 10 and 11 are preferably channel irons as shown.

Member 11 has slots 12—12 through which bolts 13—13 slidably extend, each bolt having a sleeve 14, which is slightly longer than the thickness of the center portion of member 11. Bolts 13 are provided with nuts 15, thus when these nuts are made taut member 11 will be held to member 10 but left free to move longitudinally. When there is no pull on member 11 an opening 16 is held in alignment with a pin 17. This pin extends through the top of bracket 18 and through an opening in member 10 and being pivoted at its top to an L-shaped lever 19 as at 20.

A spring 21 rests on a washer 22 which is secured to pin 17, thus normally pin 17 will be held in the position shown in Figure 1. An opening 23 is provided in the bottom of member 19 and having preferably a link or a rope secured thereto which extends to within reach of the tractor operator, thus if the operator wishes to back the trailer without engaging the brake he first pulls on the link so as to move member 19 far enough to release pin 17 so the spring will force this pin into opening 16, thus to lock member 11 and permit backing the trailer without engaging the brakes on the trailer.

Members 10 and 11 are preferably inverted U-shaped channels. The flanges of member 10 are preferably welded to depending plates 25—25. A U-shaped bracket 26 is welded to member 11 (see Figure 3). A spring 27 is provided at its front end with an eye-bolt 28 having a nut 29 which rests on a transverse plate 30 which in turn normally rests on brackets 25 and 26. Members 25 therefore act as stops and member 26 prevents forward movement of member 11 unless the pull of spring 27 is overcome.

Brackets 35—35 are secured to opposite sides of member 10. A shaft 37 is rotatably mounted in members 35. A lever 36 is secured to an end of shaft 37, the lever extending downwardly from shaft 37 and having an opening 38 to which a rope 39 is secured, the rope extending forward and being secured to the tractor acts to engage the brakes on the trailer in case member 11 becomes detached from the tractor as will hereinafter appear.

A rearwardly extending arm 40 is secured to shaft 37. A pair of U-shaped links 41 are at their rear ends pivotally connected to member 40 as at 42. The front ends of members 41 are connected to the rear end of spring 27 by means of a bolt 43; thus when lever 36 is in the position shown in Figure 1 the spring will act to hold the lever in this position because the plane of pivots 42 and 43 is above shaft 37. This position of the lever is normal. If the upper end of the lever is moved rearwardly far enough to move the plane of pivots 42 and 43 below shaft 37 it will be held in this position by spring 27 and cause the brakes to be engaged as will hereinafter appear.

Depending brackets 45—45 are secured to opposite sides of member 10 and a lever 46 is pivoted to these brackets as at 47. A link 48 is preferably forked and pivoted to member 46 as at 49. A rod 50 is preferably adjustably secured to member 48 and is at its rear end secured to the brake mechanism of the trailer. A pair of links 51 are pivoted to members 41 as at 52, the rear end being slotted as at 53 through which bolt 49 slidably extends. Thus it will be seen that if the upper end of lever 36 is moved rearwardly either by the pull of rope 39 or manually, rod 50 will be moved forward and cause the brakes to be engaged and when engaged spring 27, because of the position of pivots 42 and 43, will hold the brakes in engagement. Generally before the trailer is detached from the tractor the operator moves lever 36 so as to engage the brakes.

I provide novel and adjustable means for engaging the brakes when member 10 moves forward relative to member 11 because of a forward surge of the trailer. A plate 54 is secured to the rear end of member 11 and normally the upper end of lever 46 rests against this plate, thus clearly when member 11 moves rearwardly far enough the brakes will be engaged. This movement is provided for by slot 53 when the upper end of lever 36 is in its forward position.

It is not desirable to apply the brakes on a trailer every time there is a slight forward surge of the trailer. To prevent this and provide means whereby one can determine how much of a forward surge of the trailer will apply the brakes, I provide a toggle joint mechanism having a forward link 55 and a rear link 56, the links being pivoted together at their inner ends at 57, the forward link at its forward end being pivoted to the upper end of lever 46 as at 58. Link 56 is pivoted to member 10 as at 59, this link having considerable width at its rear end and is secured to a pull spring 60 as at 61, the pull spring being anchored to an eye-bolt 62 which extends through a bracket 63 on member 10 and having a nut 64 whereby the tension of spring 60 may be adjusted. Links 55 and 56 are held in an adjusted position by means of a bolt 65 having a lock nut 66. It will be seen that pivot 57 may be held somewhat below the plane of pivots 58 and 59 by bolt 65 and the pressure required to operate the toggle joint and the brake may be determined by the position of this bolt and the tension of spring 60.

It will be seen that mild forward surges of the trailer against member 11 will not engage the brakes and that the operator can adjust the toggle joint and control the point at which the brakes are to be engaged by a forward surge.

Clearly spring 27 will hold member 11 in its normal working position but permit this member to move forward against spring tension and since member 26 is not secured to eye-bolt 28 member 11 is free to move rearwardly relative to member 10 by overcoming the pressure of the toggle joint, thus to apply the brake when there is an abnormal forward surge of the trailer. For example in going down a steep incline in the road. In normal traveling however there will be no rearward movement of member 11 relative to member 10.

When in a standing position if the operator should back the tractor this movement might conceivably operate the toggle joint and engage the brakes. To prevent this, lever 19 is moved so pin 17 is forced into opening 16 by spring 21. Spring 27 is used to firmly hold lever 36 in its forward or rearward position and it may be used to more firmly prevent the forward movement of member 11 relative to member 10 by tightening nut 29.

Thus it will be seen that even though my device is simple, easily understood and easily operated or adjusted it is what might be called an all inclusive surge brake because every necessary operation of such a device for the safety and convenience of the driver is provided for.

Clearly many minor detailed changes can be made without departing from the spirit and scope of my invention as recited in the appended claims.

I claim:

1. A pulling vehicle and a trailer having a brake mechanism in combination, a stub pole, a forwardly extending hitch member slidably mounted on said stub pole adapted at its front end to be attached to the pulling vehicle, a toggle joint rotatably mounted at its rear end to the stub pole and at its front end to a connection leading to said brake mechanism, a spring anchored to said stub pole and to the toggle joint adapted to urge the toggle joint toward a lengthened position, adjustable means on said stub pole adapted to determine the lengthened position of the toggle joint, whereby a predetermined forward surge pressure of the trailer will release said toggle joint and operate said brake mechanism.

2. A device as recited in claim 1 including, a manually operated stop mounted on said stub pole having means whereby the operator may cause the stop to engage said hitch member and thereby make the brake operating means inactive.

3. A device as recited in claim 1 including, a stop on said stub pole, a cushion spring having a bolt secured to its front end which extends through a plate, adapted to lay on said stop, a bracket secured to said hitch member and adapted to lie against the rear of said plate whereby the hitch member is free to move rearwardly relative to the stub pole and forwardly by overcoming the pull of said cushion spring.

4. A device as recited in claim 1 including, a cushion spring its front end being pivotally anchored to the front end of said stub pole, brackets secured to the sides of said stub pole having rotatably mounted in the lower ends thereof a shaft, a rearwardly extending plate secured to said shaft, U-shaped members positioned on opposite sides of the lever, their rear ends being pivoted to the rear end of said last plate and their front ends being anchored to said cushion spring, the pivotal mountings of said U-shaped members being positioned whereby the plane of the pivots will be above said shaft when the upper end of the lever is moved forward and below said shaft when the upper end of the lever is moved rearwardly, thus to yieldingly hold the lever in either position, a pull connection associated with said lever and secured at its rear end to said brake operating means, thereby to operate the brake mechanism when the lever is moved rearwardly and leave the brake free to be operated by said hitch member when the lever is in its forward position.

5. A device as recited in claim 1 including, adjustable means adapted to prevent the rearward movement of the hitch member relative to the stub pole until after a predetermined forward surge of the trailer is exerted.

6. A device as recited in claim 1 including, said connection to the brake mechanism having associated therewith a rope with its forward end secured to the pulling vehicle and means whereby if said hitch member becomes disconnected from the pulling vehicle, the pull of the rope will operate the toggle joint to engage the brakes and hold the brakes in their engaged position.

7. A device as recited in claim 6 including, a lever pivoted at its lower end to said stub pole and having a connection to the rear end of said spring and means whereby the spring will act to hold the lever in either its forward or rearward position, link connections to said means adapted to engage the brake on the trailer when the lever is in its rear position and leave the brakes free to be operated by said hitch member when the lever is in its forward position.

8. A device as recited in claim 6 including, manually operated locking means whereby said hitch member may be locked in its position relative to the stub pole, thereby providing means for backing the trailer without engaging the brakes on the trailer.

CLARENCE B. RICHEY.

REFERENCES CITED

The following references are of record in the file of this patent:

UNITED STATES PATENTS

| Number | Name | Date |
| --- | --- | --- |
| 1,914,265 | Legg | June 13, 1933 |
| 2,048,788 | Falknor | July 28, 1936 |